Dec. 29, 1936.  A. STUCKI  2,065,763
SIDE BEARING
Filed Oct. 10, 1935
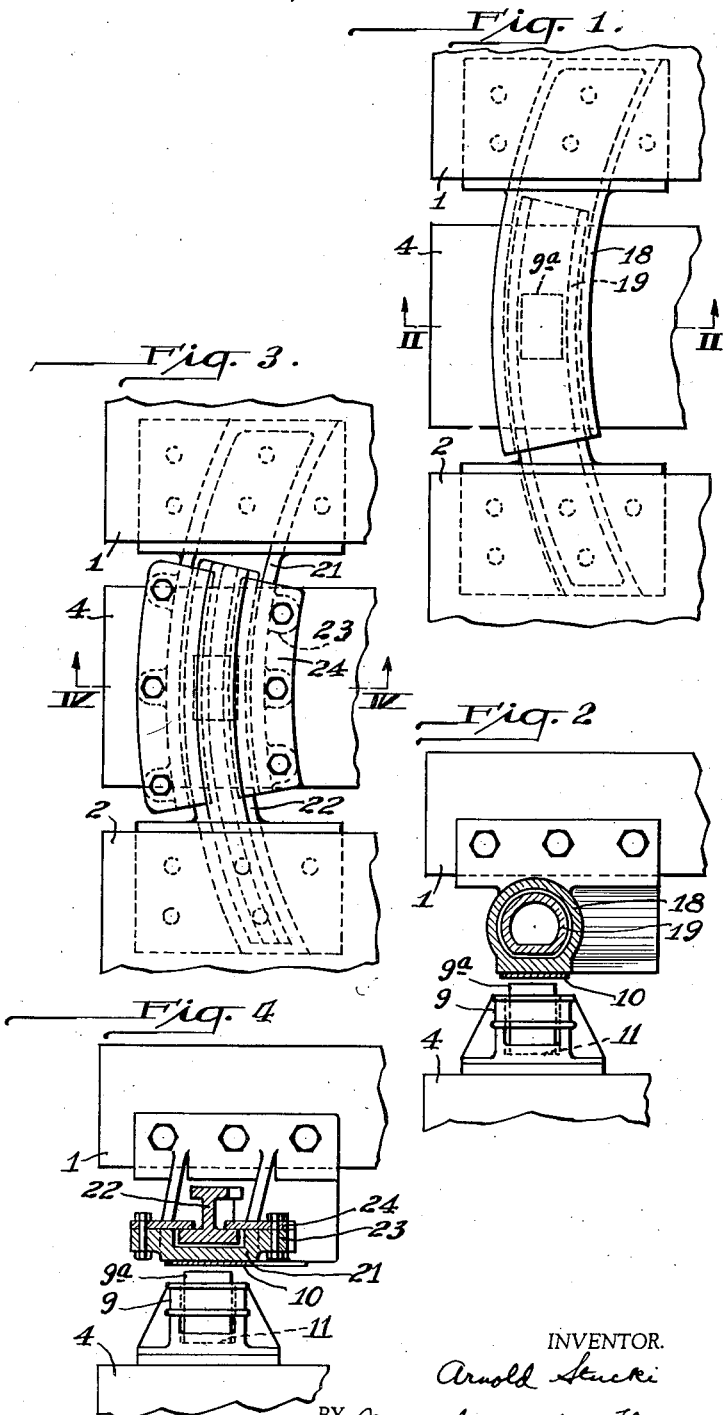
WITNESSES
INVENTOR.
Arnold Stucki
BY Brown, Critchlow & Flick
his ATTORNEYS.

Patented Dec. 29, 1936

2,065,763

UNITED STATES PATENT OFFICE 2,065,763

SIDE BEARING

Arnold Stucki, Pittsburgh, Pa.

Application October 10, 1935, Serial No. 44,338

5 Claims. (Cl. 105—4)

This invention relates to side bearings for railway cars, and more particularly to a side bearing assembly for use on articulated trains wherein a single truck supports the adjacent ends of the adjoining car bodies.

It is among the objects of this invention to provide a side bearing assembly for articulated trains in which only two truck side bearings are required on each truck bolster, and by which adjoining car ends are maintained in substantial alignment.

Another object is to provide a frictionless side bearing which is so constructed that the truck can swivel freely, thereby preserving the wheel flanges, rails and power.

These and various other objects as well as the various other novel features and advantages of the invention will be apparent when the following detailed description is read in conjunction with the accompanying drawing, in which Fig. 1 is a fragmentary plan view of the ends of two car bodies showing side bearing arms projecting over one end of a truck bolster; Fig. 2 a vertical section taken on the line II—II of Fig. 1; Fig. 3 a fragmentary plan view showing a modified embodiment of the invention; and Fig. 4 a vertical section taken on the line IV—IV of Fig. 3.

According to the invention the adjacent ends of the cars 1 and 2, which are pivotally connected together at the center of the truck bolster 4, are provided with cooperating pairs of symmetrically arranged side bearing arms 18 and 19 which are suitably secured to the framework of the cars and projected with their axes in substantially vertical alignment over the truck bolster 4. In other words, these arms are uniformly spaced from the center of the car and so mounted that the one pair bears upon the other when the car is tilted and the supporting pair bears upon a pair of roller side bearings 9 (Fig. 2) of suitable construction which are mounted in a well known manner on the truck bolster 4. With such an arrangement only a single pair of roller side bearings is required to support and limit the lateral tilting movement of the cars and the truck is afforded substantially free pivotal movement.

To increase the life and reduce the friction of the bearing assembly which is arranged to permit a limited play between the various parts, the lower side arms are shown provided with hardened wear plates 10 that are adapted to engage rollers 9a of the side bearings (Fig. 2), and of course similar plates may also be secured to the other contacting surfaces.

As is shown in Figs. 1 and 2 of the drawing the side bearing arms 18 and 19 are preferably in the shape of tubes with one telescoping loosely within the other. These tubes are arcuate lengthwise with the center of the arc at the pivot point of the cars on bolster 4. Thus, when the cars turn on their pivot the tubular side bearing arms move inwardly and outwardly relative to each other without binding. The bottom portions of these tubes are preferably provided with flat bearing surfaces, and there is the usual clearance between the arms. This form, in addition to being exceptionally strong, limits the upward as well as the downward movement of the inner arms relative to the outer ones.

The modification shown in Figs. 3 and 4 comprises shallow channel shaped lower bearing arms 21 which receive I-beam shaped upper bearing arms 22. To limit the vertical movement of these arms away from each other in a definitely restricted manner, the lower arms 21 are provided with laterally projecting lugs 23 to the tops of which are bolted plates 24 that overlie the lower flanges of the inner arms 22. These arms are likewise arcuate lengthwise so that the cars 1 and 2 can pivot on the truck bolster 4 without the upper and lower arms binding together.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. The combination with a car truck having a bolster, of articulated car bodies pivotally mounted at their ends on said bolster, and tubular side bearing arms mounted on said ends of the car bodies and projecting over said bolster in telescoping relation.

2. The combination with a car truck having a bolster, of articulated car bodies pivotally mounted at their ends on said bolster, side bearing arms mounted on said ends of the car bodies and projecting over said bolster with the arms on one car overlapping those on the other car, and means for limiting vertical movement of the overlapping arms away from each other.

3. The combination with a car truck having a bolster, of articulated car bodies pivotally mounted at their ends on said bolster, and side bearing arms mounted on said ends of the car bodies and projecting over said bolster with the arms on one car overlapping those on the other car, the upper bearing arms being of I-beam shape and the lower bearing arms being provided with means for limiting vertical movement of the arms away from each other.

4. The combination with a car truck having a bolster, of articulated car bodies pivotally mounted at their ends on said bolster, and tubular side bearing arms mounted on said ends of the car bodies and projecting over said bolster in telescoping relation, said bearing arms being arcuate and concentric with the pivot point of said cars on said bolster.

5. The combination with a car truck having a bolster, of articulated car bodies pivotally mounted at their ends on said bolster, and side bearing arms mounted on said ends of the car bodies and projecting over said bolster with the arms on one car overlapping those on the other car, the upper bearing arms being of I-beam shape and the lower bearing arms being provided with means for limiting vertical movement of the arms away from each other; said bearing arms being arcuate and concentric with the pivot point of said cars on said bolster.

ARNOLD STUCKI.